Feb. 14, 1961   J. R. ZACHARIAS ET AL   2,972,115
MOLECULAR BEAM APPARATUS
Filed Oct. 29, 1957   6 Sheets-Sheet 1

INVENTORS
JERROLD R. ZACHARIAS
JOSEPH H. HOLLOWAY
EUGENE F. GRANT
BY KENWAY, JENNEY, WITTER & HILDRETH
ATTORNEYS

Feb. 14, 1961  J. R. ZACHARIAS ET AL  2,972,115
MOLECULAR BEAM APPARATUS
Filed Oct. 29, 1957  6 Sheets—Sheet 2

INVENTORS
JERROLD R. ZACHARIAS
JOSEPH H. HOLLOWAY
EUGENE F. GRANT
BY
KENWAY, JENNEY, WITTER & HILDRETH
ATTORNEYS

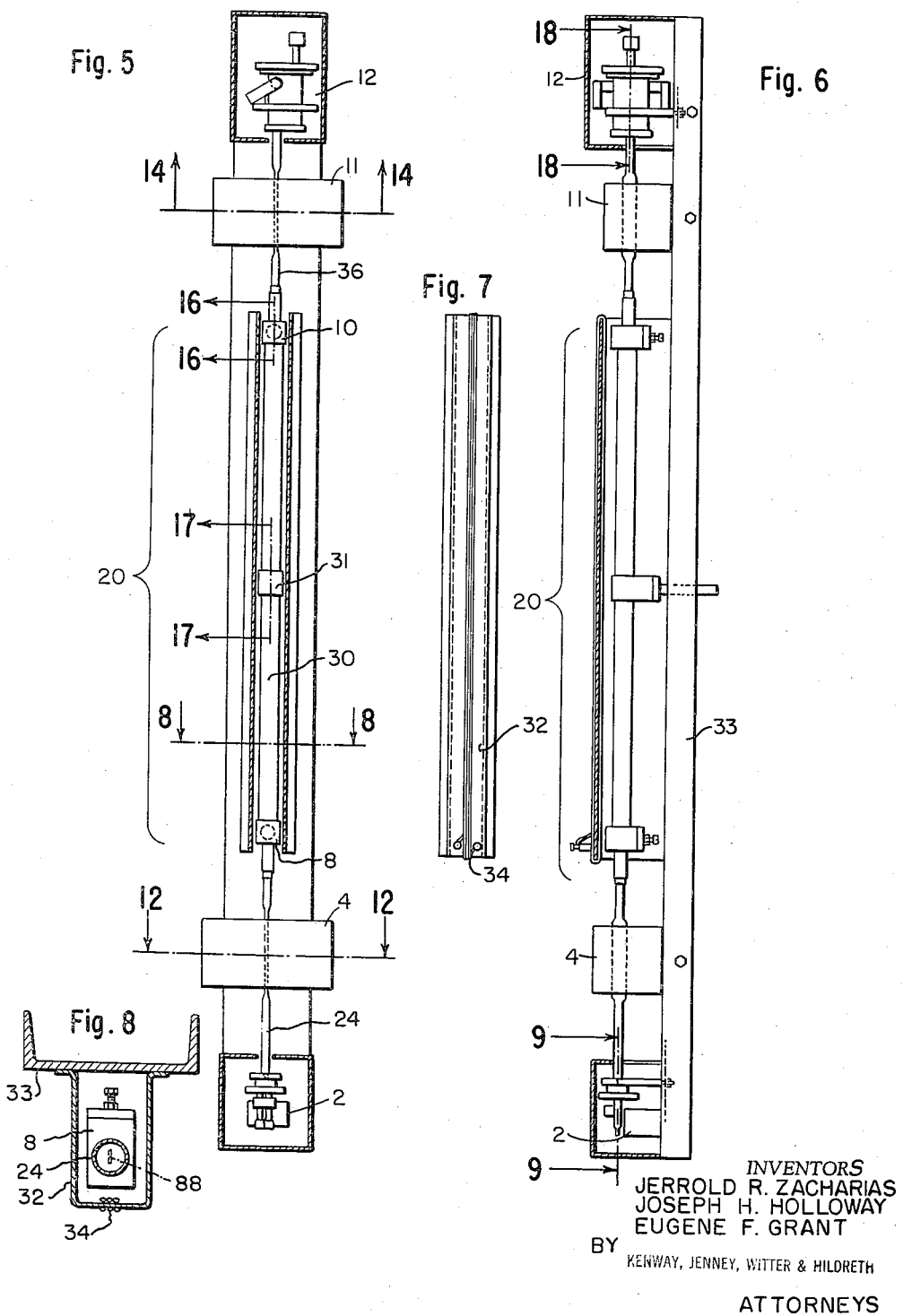

INVENTORS
JERROLD R. ZACHARIAS
JOSEPH H. HOLLOWAY
EUGENE F. GRANT
BY
KENWAY, JENNEY, WITTER & HILDRETH

ATTORNEYS

Feb. 14, 1961  J. R. ZACHARIAS ET AL  2,972,115
MOLECULAR BEAM APPARATUS

Filed Oct. 29, 1957  6 Sheets-Sheet 5

INVENTORS
JERROLD R. ZACHARIAS
JOSEPH H. HOLLOWAY
EUGENE F. GRANT
BY
KENWAY, JENNEY, WITTER & HILDRETH

ATTORNEYS

Feb. 14, 1961  J. R. ZACHARIAS ET AL  2,972,115
MOLECULAR BEAM APPARATUS
Filed Oct. 29, 1957  6 Sheets-Sheet 6
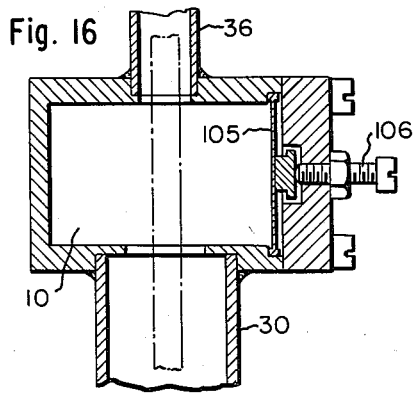
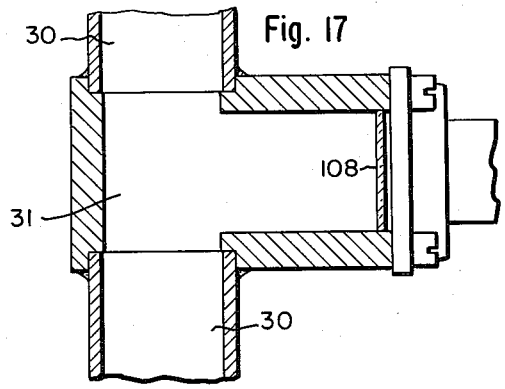
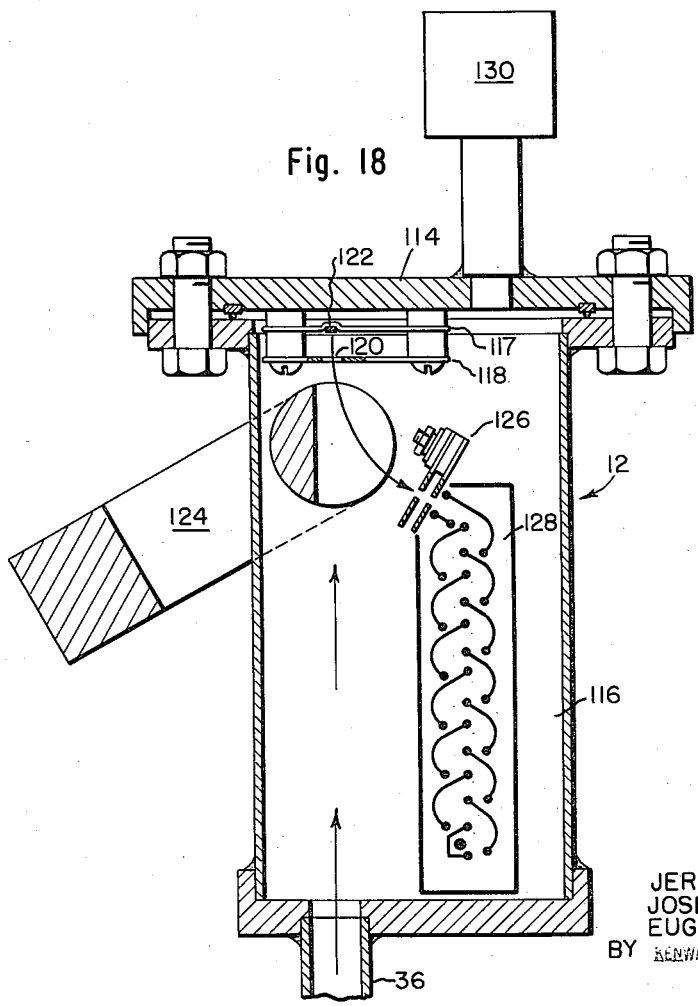
INVENTORS
JERROLD R. ZACHARIAS
JOSEPH H. HOLLOWAY
EUGENE F. GRANT
BY KENWAY, JENNEY, WITTER & HILDRETH
ATTORNEYS

United States Patent Office 2,972,115
Patented Feb. 14, 1961

2,972,115

MOLECULAR BEAM APPARATUS

Jerrold R. Zacharias, Newton, Joseph H. Holloway, Topsfield, and Eugene F. Grant, Marblehead, Mass., assignors to National Company, Inc., Malden, Mass., a corporation of Massachusetts Filed Oct. 29, 1957, Ser. No. 693,104

10 Claims. (Cl. 331—3)

This invention relates to apparatus for accurately maintaining a standard of frequency by utilizing an atomic radio-frequency spectral line as a stable reference and more particularly to apparatus based on the atomic beam magnetic resonance method to observe a radio-frequency spectral line.

In the frequency standard of this invention oscillations produced by a flywheel oscillator are compared with an atomic resonance frequency. A correction signal obtained from this comparison varies in magnitude and sense with the difference between the generated oscillation frequency and the atomic resonance frequency. This correction signal is then applied to the flywheel oscillator in a manner to null the difference, so that the average frequency difference is maintained equal to zero. Thus, when periods substantially greater than the reaction time of the correcting mechanism are considered, the phase advance of the flywheel oscillator is uniquely related as that of the oscillating atom and does not depend upon such factors as the drift of quartz crystals and macroscopic resonators.

It has heretofore been proposed to use the hyperfine energy structure of an alkali metal atom (e.g. cesium) to control the frequency of an oscillator, but so far as we are aware, prior efforts have not gone beyond laboratory experiments. For example, prior equipment required practically continuous pumping, and was capable of operation only for relatively short periods, besides being too bulky for portable use. For most military, industrial and scientific applications it is desirable to have an extremely precise frequency standard in the form of portable self-contained apparatus.

The principal object of this invention is to provide a precise and reliable frequency control, utilizing permanently sealed self-contained equipment, and capable of sustained operation over long periods of time.

With this and other objects in view, as will hereinafter appear, the present invention comprises the features hereinafter described and particularly defined in the claims.

In the drawings illustrating the present invention, Fig. 1 is a diagram of the atomic beam tube and associated circuits;

Figs. 5 and 6 are elevations, partly in section of the atomic beam tube assembly of this invention;

Fig. 7 is an elevation of the magnetic shield and C-field winding;

Fig. 8 is an enlarged sectional view on line 8—8 of Fig. 5;

Fig. 16 is a sectional view of one of the cavities on the line 16—16 of Fig. 5;

Fig. 17 is a sectional elevation of the feed-point on the line 17—17 of Fig. 5; and Fig. 18 is a schematic cross-sectional elevation of the detector employed in the present invention on the line 20—20 of Fig. 6.

*General description*

The procedure used by this invention to carry out the frequency comparison and obtain the necessary correction signal is known as the atomic beam magnetic resonance method. This method has been in use in experimental physics since the mid 1930's to examine the radio-frequency spectra of many atoms and molecules. Since the principles of atomic resonance are well known, only so much of the theory will be here presented as is necessary for an understanding of the operation of the atomic beam device of the present invention.

The emission and absorption of radiation by atoms is a familiar phenomenon which is adequately explained by applying the quantum laws of motion to the orbital electrons and nucleons. These laws of motion predict the existence of a series of discrete configurations. To each of these discrete configurations can be assigned an energy value which represents the sum of potential and kinetic energy associated with that state of the electron-nuclear motion. To change its state from one to another of the allowed configurations the atom must either dispose of or acquire the energy difference between the levels, depending upon whether the final state energy is lower or higher, respectively, than the initial state. One mechanism for this transition is the emission or absorption of an electromagnetic wave train in which is contained the energy difference. The frequency of this wave train is determined by the difference in energies between the initial and final state. If the radiation is applied only for a finite time duration, it does not appear to the atom to be monochromatic, but the frequency width of spectral lines is approximately 1/T, where T is the duration of the wave train.

This invention is concerned with the induction of transitions between levels whose energy difference is small; that is, frequencies in the microwave region, arising from the "hyperfine structure," representing the interaction between the nuclear magnetism and the electronic magnetism set up by the electron spin.

Figure 2:
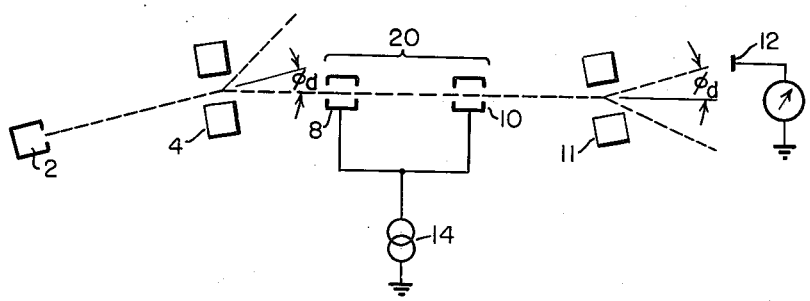
Fig. 2 is a diagram of the beam tube to illustrate the principles of the invention.

The preferred form of the invention comprises the arrangement shown diagrammatically in Fig. 2. A beam of particles (preferably atoms of $Cs^{133}$) effuses from a hot source 2 and enters the field of the strong spatially inhomogeneous A magnet 4. Just prior to entering the magnetic field, the particles are distributed in the two "zero field" hyperfine levels $f=4$ and $f=3$.

In an inhomogeneous magnetic field, the atoms are subjected to forces dependent on the gradient of the magnetic field. Also the energy states $f=3$ and $f=4$ split up into sublevels.

Figure 3:
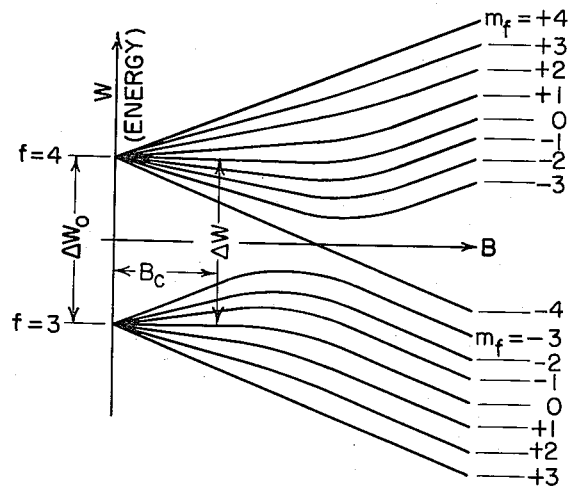
Fig. 3 is a graph showing schematically the splitting of hyperfine levels in an external magnetic field.

Fig. 3 represents the dependence of all the hyperfine levels of the ground electronic state of $Cs^{133}$ upon an external magnetic field. As is usual in the case of Zeeman splitting, each of the levels is characterized by a set of two numbers $f$ and $m_f$. The first number $f$ is related to the magnitude of the total angular momentum of the Cs[133] atom (electronic plus nuclear) while the second number, $m_f$, is related to the component of this total angular momentum which is in the direction of the applied external magnetic field.

Fig. 3 shows in general how the energies of the various sublevels change adiabatically (i.e. without transitions) under the influence of a magnetic field. The A field produced by the magnet 4 is as strong as possible in order that the gradient may be sufficiently large to cause selective deflections of the atoms in the different energy states.

Figure 1:
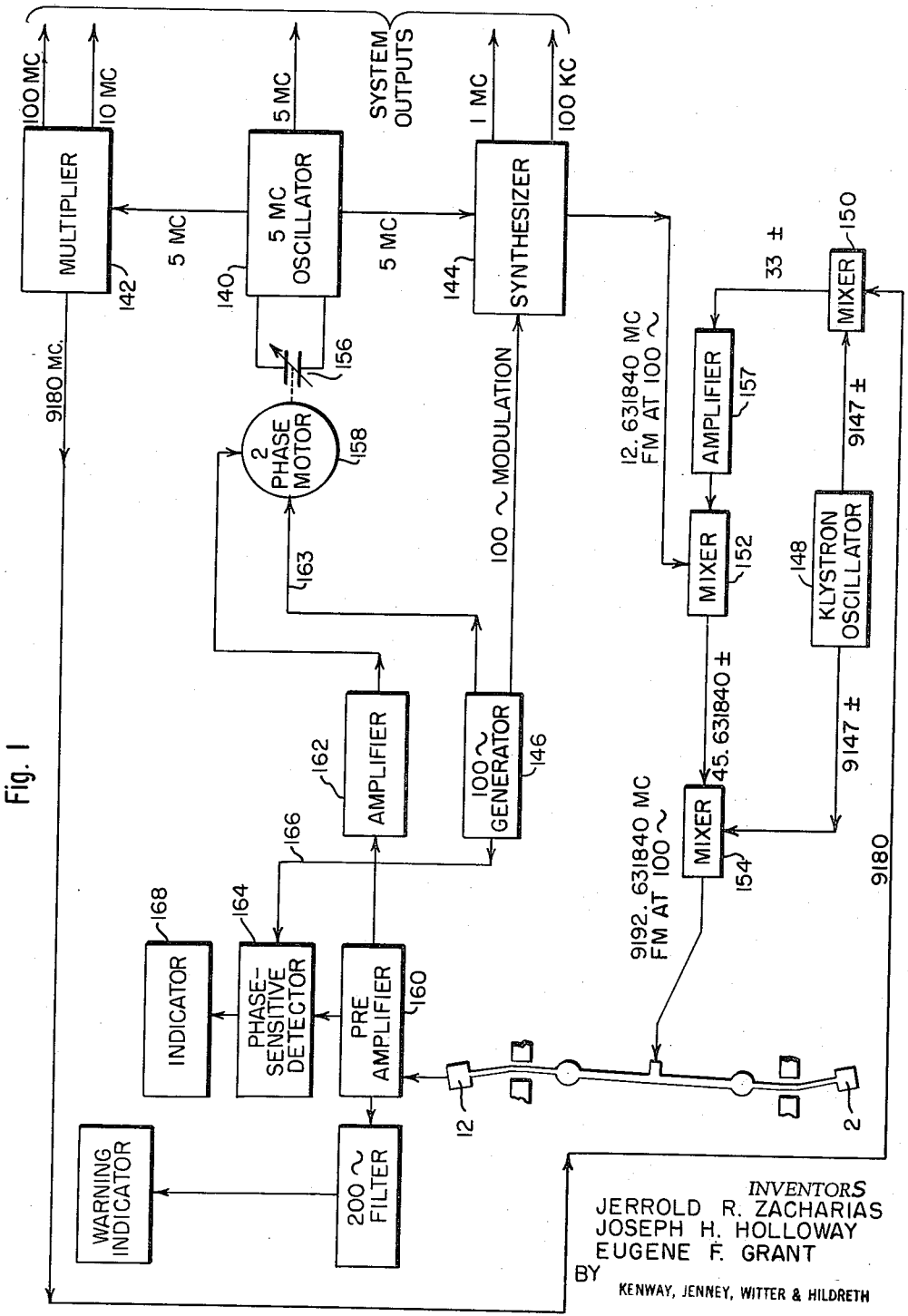

In the A magnet field, all of the atoms in the sublevels of the $f=4$ state, except those for which $m_f=-4$, are deflected in one direction, and all other atoms are deflected in the other direction. Those deflected in one direction are discarded, while the others proceed through the apparatus. It is a matter of choice which group is used, but in the specific description of the present invention the $f=3$ group (together with the atoms of the (4, −4) sublevel) are passed through, while the others are discarded. The undiscarded atoms include those of the (3, 0) sublevel, which is of primary importance; these undiscarded atoms are deflected from the original beam axis by an angle $\phi^d$, which is shown exaggerated in Figs. 1 and 2 since the actual angle may be about 0.01 radian.

Upon emergence from the A field, the atoms enter a central region 20, wherein they are subjected to a weak uniform field $B_c$ and an oscillating field. The field strength $B_c$ is shown in Fig. 3 as a field near zero, but of a sufficient magnitude to afford some separation between the energy sublevels of the atoms. The oscillating field is produced in cavities 8 and 10 and is controlled in a manner to maintain it as the proper frequency to cause transitions from the (3, 0) to the (4, 0) sublevel.

The (3, 0)→(4, 0) transition is of the utmost importance, because it is the only transition that is not linearly dependent on the strength of the C-field. This will be explained presently; for the moment we continue with a general description of the paths of the atoms through the apparatus.

After leaving the cavity 10, the beam is acted on by the B magnet (shown at 11), a second strong magnet producing an inhomogeneous field, with both its field and its gradient in the same direction as for the A magnet. Here the atoms of all $f=3$ groups (and also those of the (4, −4,) sublevel) are deflected in a direction to be discarded. The only undiscarded atoms are those of the (4, 0) sublevel, which exist at this point only by reason of the transition described above. These are allowed to proceed toward the detector 12. The detector may be of any suitable form, but is preferably of the ionizer-collector type.

Figure 4:
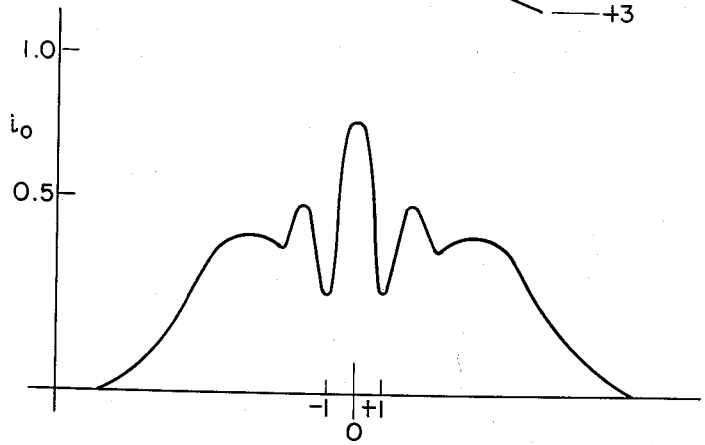
Fig. 4 is a graph illustrating the shape of the cesium resonance line.

The magnitude of the detector current depends on frequency, and specifically in the manner illustrated in Fig. 4. The detector current, after suitable amplification, is utilized to drive a servo system to control the frequency of the generator 14 from which the cavities 8 and 10 are excited. The control system is operated in a manner to cause the detector current to search continually for its maximum value, and under these conditions the average frequency of the R.F. excitation of the cavities will be held to the frequency represented by the (3, 0)↔(4, 0) transition of the cesium atom.

Having thus described the general construction of the system, we turn back to an explanation of the mechanism underlying the preferred transition. Radiative transitions between any pair of levels are possible, subject to the conditions $\Delta f=\pm 1$ and $\Delta m_f=0$ or $\pm 1$. The advantage of the (3, 0)↔(4, 0) transition over all others is that the energy separation of these levels varies only quadratically with the externally applied C field, while the energy separations of all other levels for which radiative transitions are possible involve a linear dependence upon the external field. The relatively insensitive quadratic dependence is most important for frequency control in order that the controlled quantity be most nearly characteristic of the invariant internal properties of the atom. For the (3, 0)↔(4, 0) transition, the energy separation is expressed in terms of the external magnetic field by $\Delta W = \Delta W_0 + 427hB_c^2$ where $h$ is Planck's constant. The frequency of the radiative transition involved is $\nu = \nu_0 + 427B_c^2$; $\nu_0 = 9{,}192.631840$ megacycles per second is a constant, the zero field transition frequency, and $\nu$ is in cycles per second when $B_c$ is expressed in gauss.

Some of the Cs[133] atoms in the presence of a small uniform external field, $B_c$, are in a state characterized by $f=4$, $m_f=0$. In this state the effective magnetic field, $B_N$, arising from the magnetic moment of the nuclus is perpendicular to the external field, $B_c$. The total effective magnetic field which influences the motion of the valence electron is therefore the vector sum of $B_c$ and $B_N$, and since $B_c$ and $B_N$ are at right angles to each other, the total field is only quadratically dependent on $B_c$, a condition which exists only for those states in which $m_f=0$. For all states in which $m_f\neq 0$, $B_N$ is not perpendicular to the external field, and there is a component of $B_c$ in the direction of $B_N$; in other words, the total field involves a term linearly dependent on $B_c$. A small field $B_c$ therefore serves to split the energy levels into the sublevels shown in Fig. 3 while still maintaining the $m_f=0$ state nearly independent of field strength. Preferably $B_c$ is about 0.05 gauss.

It is well known that a change in electron orientation corresponding to a change from the $f=4$ to $f=3$ state or vice versa may be induced by the application of linearly polarized radiation in a direction essentially perpendicular to the field in which the electron moves and having a radian frequency, $\omega$, equal to the Larmor precession. The proper direction for the radio frequency magnetic field is parallel to $B_c$. This is accomplished in the resonant cavities 8 and 10 which are excited in the $TE_{112}$ mode as will be described later.

Although transitions other than (3, 0)↔(4, 0) are possible, they are sufficiently separated in frequency from the preferred transition, so that the control apparatus will unambiguously fix upon the correct frequency.

The above considerations are not limited to this atom alone. They apply to certain isotopes of other alkali metals, and indeed to any electron re-orientation transitions in atoms or molecules for which the net atomic or molecular angular momentum, $f$, is an integer in quantum units of $h$. Cs[133] has, however, been found desirable for a number of reasons, among which may be mentioned that its frequency is the highest resonant frequency obtainable in the hyperfine structure of available alkali metals, and yet is capable of being handled within the scope of present day microwave techniques; also that neutral cesium atoms are most readily detected by surface ionization. In general, however, it is contemplated any molecular beam having desired transition characteristics may be used, and the term "molecular beam" as used herein is not intended to be limited to a beam of cesium atoms.

Beam tube

Referring to Figs. 5 to 18, the beam tube is provided with a cesium chamber or source oven 2 at one end and the detector 12 at the other end. The beam of cesium atoms produced in the source oven 2 as described above, successively undergoes the interaction with the "A" magnetic field produced in deflecting magnet 4, the weak homogeneous "C" magnetic field and the oscillating field in the central portion 20, and finally the "B" magnetic field produced by deflecting magnet 11.

The detector 12 and the cesium chamber 2 are offset from the longitudinal axis of the beam tube. The beam of atoms passing through the inhomogeneous field produced by magnet 4 is split, as described above (Fig. 2) so that only those atoms having predetermined energy levels are deflected through the beam tube. Those atoms whose energies cause them to be discarded collide with the walls of the tube and are there absorbed. Those atoms which continue through the tube are subjected to the oscillating electromagnetic fields in cavities 8 and 10, and if the applied wave is at the correct resonant frequency changes in energy level take place. The weak uniform magnetic field (C field) present in the central portion 20 has already been described. The inhomogeneous magnetic field produced by the B magnet 11, as stated before, has approximately the same strength and the space gradient is oriented in the same direction as the A magnet 4. As heretofore described, this results in discarding all atoms except those which have undergone a transition to the (4, 0) state. These latter pass to the ionizer-detector 12.

As viewed in Figs. 5 and 6 the device of this invention is operated in an upright position, but it may be operated in any position. The source-oven 2 is at the lower end and the detector 12 is at the upper end. Brazed to the oven 2 on one end is a piece of small-diameter metal tubing 24. The other end of the section of tubing 24 is brazed to the cavity 8. This tubing 24 has an internal diameter sufficient to allow the beam produced by the source-oven to pass through it. The tubing 24 is constructed of a material such that it may be deformed in the region of the deflecting magnet 4 so as to conform to the shape of the pole pieces 84 as described below. Also the tubing 24 must be capable of being bent slightly to provide the offset $\phi_d$ described above. While the internal diameter of the tubing is sufficient to allow the unrestricted passage of the beam of atoms it is preferably not so large as to permit propagation of the exciting wave beyond the cavity 8.

The cavity 8 is brazed to a waveguide 30 made up of two sections of tubing connected to a microwave feed-point 31. It is in the cavity 8 and its counterpart, cavity 10, that the beam of atoms is subjected to the exciting wave in sufficient power to cause transitions in energy level. The feed-point 31 is brazed to the ends of the waveguide portions. The upper end of the waveguide 30 is brazed to the cavity 10.

Each cavity 8 and 10 is cylindrical and the waveguide 30 is cylindrical. The waveguide is excited in the $TE_{11}$ mode, and the cavities are excited in the $TE_{112}$ mode. The atom beam is caused to pass through the center of the cavity where the most intense oscillating magnetic field exists across the beam.

The waveguide and cavities are contained within a deep U-shaped shield 32, which extends the entire length of the central portion 20 of the apparatus. The shield is of magnetic material, and is secured to the non-magnetic base 33. The winding 34 for the C field is wound longitudinally on the shield. As shown particularly in Fig. 8, the waveguide and cavities are received within the shield near the base of the U-section. The magnetic field produced by the winding 34 is directed by the shield directly across the cavities 8 and 10, as well as the waveguide 30, and is in the same direction as the oscillating field. The arrangement of the waveguide and cavities within the shield at a position remote from the open end of the U-section prevents entry of the earth's field or other external fields into the region of the beam.

A tube 36 similar to the tube 24 is brazed to the cavity 10 at one end and to the housing of the detector 12 at the other end. The tube 36 passes through the B magnet 11.

It will be noted that all portions of the beam tube are brazed together or brazed onto the elements that lie along the path of the beam of atoms from the source-oven to the detector. It is essential that as complete a vacuum as possible exist throughout the entire device, preferably $10^{-7}$ mm. Hg or better, since any residual molecules or atoms of gas in the path of the beam would collide with the cesium atoms and cause a scattering of the beam. In order to provide the required vacuum, the source-oven, the detector and the tubes are all constructed so that they are completely sealed from the outside atmosphere. In this manner a collision-free path for the beam of atoms is provided.

The parts of the apparatus will now be described in detail, starting with the oven 2 and proceeding toward the detector 12.

Figure 10:
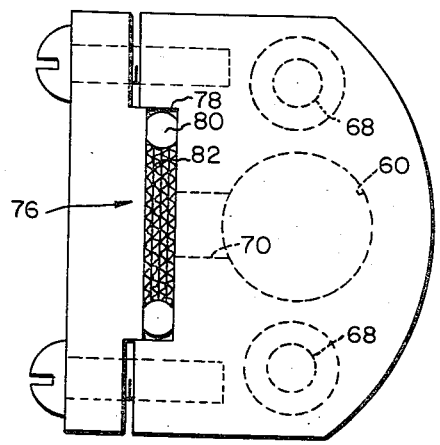
Fig. 10 is a sectional end view of the source oven on the line 10—10 of Fig. 9.
Figure 11:
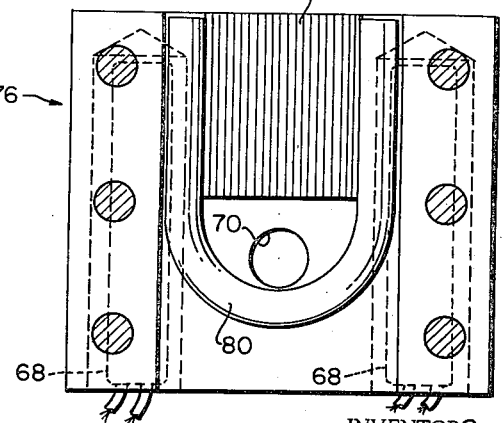
Fig. 11 is a sectional view of the beam producing means along the line 11—11 of Fig. 9.

The function of the source 2 is to provide a stable beam of atoms of substantially constant intensity. In addition the source preferably shapes the beam so that the maximum effect may be achieved, as the beam progresses through the tube. An apparatus that achieves these and other purposes is illustrated in Figs. 9 to 11.

Figure 9:
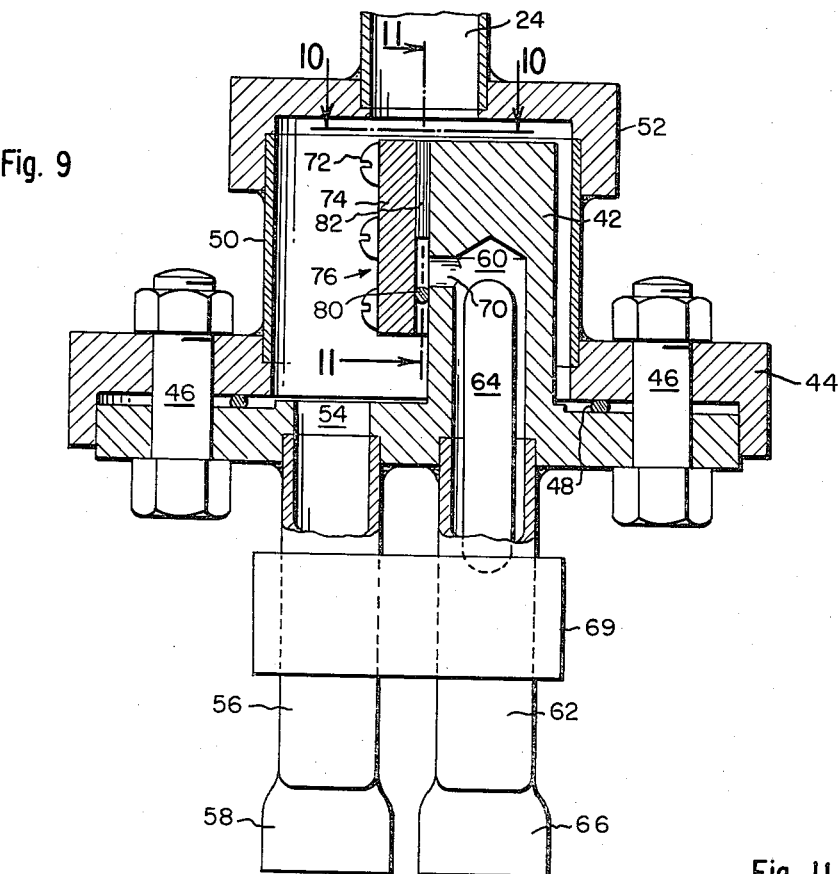
Fig. 9 is a sectional view of the cesium chamber or source oven.

In Fig. 9 the source-oven 2 is shown in its entirety. It is made up from a number of components, which are brazed together or sealed together to provide a gas-tight enclosure. The oven block 42 is fitted onto a flanged housing 44 by bolts 46. A metal gasket 48 provides a seal between the oven block 42 and the housing 44. A cylindrical member 50 forms side walls which fit into and are brazed to the housing 44. The cylindrical member 50 is preferably made of a material that has poor heat conductivity. The other end of the cylindrical member 50 fits into and is brazed onto an end cap 52. In turn the end cap 52 has a hole which receives the tubing 24 which is joined thereto by brazing.

The oven block 42 has two openings 54, 60. The opening 54 receives an exhaust tube 56. The exhaust tube 56 is shown sealed off at its lower end 58, after the beam tube is evacuated.

The other opening 60 is designed to receive a deformable housing 62 for the cesium ampoule 64. The ampoule 64 is made of glass. It contains cesium in as pure a form as possible to make sure that there is no opportunity for contamination of the vacuum. In addition the interior surfaces throughout the entire device must be as free from impurities and foreign matter as possible. The cesium ampoule 64 as used in the device of this invention contains approximately 0.5 gram of cesium, which is sufficient for normal operation for many years.

The ampoule 64 is inserted into the deformable housing 62 prior to evacuation of the system and the lower end 66 of the housing 62 is sealed in the manner illustrated. The opening 60 extends up into the oven block 42 as shown and provides a reservoir for the cesium. After the system has been evacuated and sealed, a clamp (not shown) is used to break the ampoule 64 by squeezing the deformable housing 62 until the glass ampoule breaks. The cesium is then ready to be heated as described below to form the beam of atoms.

The oven block 42 is heated by electrical resistance elements 68 which extend into the oven block as shown. The temperature of the oven block is controlled by a thermostat 69. The thermostatic control is preferably adjusted so that the temperature remains at 65° C.±1° during operation of the system, at which temperature there is sufficient cesium vapor to form the required beam.

A horizontal opening 70 allows the atoms of cesium to escape from the oven block 42. Positioned above the opening 70 and attached by screws 72 to the oven block 42 is an oven cap 74. A dependent portion 76 fits into a slot 78 in the oven blocks 42. A U-shaped metal gasket 80 seals these two components together in such a manner that the atoms escaping from the oven block may effuse only upward toward the open end of the tubing 24.

A collimating means by which the beam of atoms is given shape and direction is formed from sheets of corrugated metal foil sandwiched between flat sheets, as shown at 82. These sheets 82 are held in place by the cap 74 which is sealed by the gasket 80. The corrugations are longitudinal so that when properly oriented and stacked together the foil sheets 82 form a large number of elongated, longitudinal channels. In this manner a beam is produced that has a rectangular cross section. Since the cross section of the collimator 82 as seen in Fig. 10 is essentially uniform the beam will have a substantially constant intensity over its cross section. The atoms effusing out of the oven block 42 and the collimator 82 travel at thermal velocities, and since the interior of the entire system is evacuated would normally travel in a straight line. For this reason the alignment of the source 2, and hence the beam of atoms produced by the source, must be carefully adjusted. The method by which this alignment is accomplished will be discussed below after the remainder of the components have been described.

Figure 12:
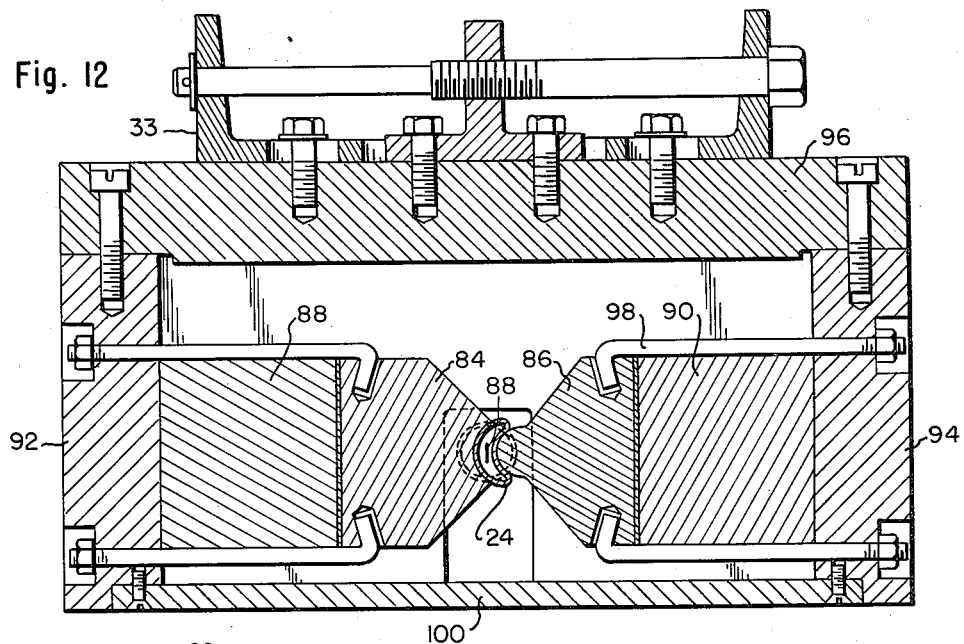
Fig. 12 is a sectional end view of the first deflecting magnet taken on the line 12—12 of Fig. 5.

The beam of atoms produced as described above effuses out of the collimator 82 and passes into the tubing 24. The beam continues in a straight line until it passes through the magnetic field produced by the deflecting A magnet 4. The magnets 4 and 11 are of the same size, strength, and configuration, and a description of one will suffice. The pole pieces 84, 86 (see Fig. 12) are shaped to produce an inhomogeneous magnetic field inside the tube 24. In one form the tube 24 is deformed so that its cross-section corresponds to the cross-section of the space between the pole pieces 84, 86, as shown in Fig. 12. The cross-section of the rectangular atom beam is shown at 88.

Figure 13:
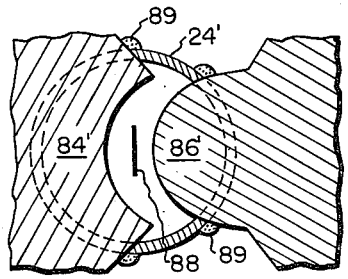
Fig. 13 is an enlarged sectional view of a modified, and in some respects, preferable arrangement of the tube and the pole pieces of the first deflecting magnet.

In the preferred form of tube and magnet arrangement, as shown in Fig. 13, which is on a somewhat enlarged scale from Fig. 12, the tube 24' is not distorted but is provided with openings in its walls to receive the pole pieces 84', 86'. The tube 24' is preferably of somewhat larger diameter than the tube 24. The pole pieces are hermetically sealed into the tube wall by brazing or welding, as indicated at 89. The magnet assembly may be mounted as in Fig. 12. This construction has the advantage that the two magnet poles may be brought into closer proximity than in Fig. 12, so that an inhomogeneous field of maximum intensity may be obtained.

Since the source is offset from the long axis of the beam tube, about one half of the atoms collide with the interior walls of the tube 24 where they remain due to the absorption by or interaction with the tube surface. The paths of the other half are deflected or bent so that they continue through the beam tube, as described in connection with Fig. 2.

The pole pieces 84, 86 are made from soft magnet iron and the magnetomotive force is provided by permanent magnets 88, 90. The strength of the field produced by these magnets 88, 90 should be as high as possible but should be at least 5000 gauss to achieve the necessary deflecting effect, and preferably about 9000 gauss. Side members 92, 94 are attached to an iron base 96 which forms the iron return for the magnetic flux. The pole pieces 84, 86 and the permanent magnets 88, 90 are held in place by clamps 98 attached to the side pieces 92, 94. A non-magnet cap member 100 covers the side of the magnet assembly.

Figure 14:
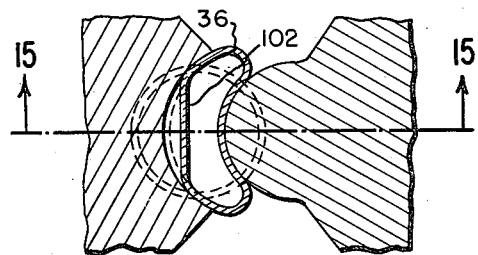
Fig. 14 is a sectional view of the deformed tube of the second deflecting magnet on line 14—14 of Figs. 5 and 15.
Figure 15:
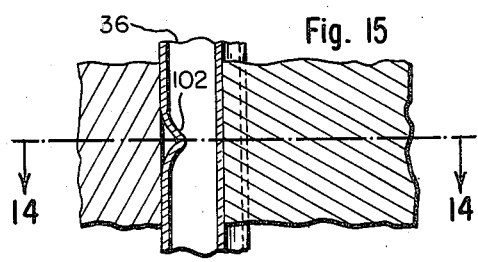
Fig. 15 is a sectional view of the deformed tube region of the second deflecting magnet on the line 15—15 of Fig. 14.

The B magnet 11 is of the same construction as magnet 4. However, as illustrated in Figs. 14 and 15, the tube 36 has an indented portion 102 formed in its side nearest the pole piece 84. This indented portion 102 acts as a barrier to exclude from the beam atoms that are not properly directed toward the detector 12.

As in the A-magnet construction of Fig. 13, the B magnet pole pieces may extend through openings in the wall of the tube 36, and this construction is preferred because of the higher field intensity that may be obtained. In that case the pole pieces may be formed with a projection constituting the barrier of the same shape as that shown at 102 in Fig. 15.

After the beam of atoms is split by the action of deflecting magnet 4, those atoms that are deflected so that their path corresponds with the longitudinal axis of the beam tube, come into the cavities 8 and 10. If a high-frequency signal having the proper frequency is present some of the atoms will undergo the transition described above. The waveguide 30 serves to propagate the high-frequency wave from the feed point 31 to the cavities. The wave travels in both directions to the cavities 8 and 10. Figs. 16 and 17 show the structure of the cavities 8, 10 and the feed point 31 respectively. The interior diameter of the waveguide portion 30 is such that the wave will propagate easily. However, the interior diameter of the tubing 24, 36 is too small for the wave to propagate; therefore the wave pattern terminates in the cavities.

The waveguide 30 should be as long as possible, since the sharpness of the resonance increases as the separation of the cavities increases.

The cavities 8 and 10 are tunable by means of a diaphragm 105 and a set-screw 106. In order to provide for the proper phase of the fields acting on the atoms in the cavities 8, 10, they are positioned an equal number of half-waves from the center of feed point 31. In the waveguide the effect of the field on the atoms is very small, and all transitions occur by reason of the oscillating fields in the cavities.

As shown in Fig. 17 the microwave energy is fed into the feed-point 31 through a window 108.

The use of two separated cavities to induce the transitions follows the method described by Ramsey (see Molecular Beams, by Ramsey, Oxford University Press, 1956, pp. 124 et seq. and references cited therein). For correct operation, it is essential that the fields in the two cavities oscillate in the same time phase; otherwise a shift in the resonant frequency will occur. This requires that the electrical lengths of the two waveguide portions be equal (to within a slight tolerance) and that the cavities be properly tuned. Equality of phase is determined after assembly by measuring the detector output over a range of frequencies. If the plot of output against frequency is symmetrical, as in Fig. 4, it indicates correct phasing, but incorrect phase is indicated by asymmetries in the plot. Some asymmetry may be corrected by tuning the cavities, but large asymmetry will usually require reconstruction of the waveguide.

After passing the central region 20, the atoms enter the deflecting B field produced by the magnet 11, which has already been described. Only those atoms which have undergone a transition to the (4, 0) state are in the proper direction to strike the detector 12. The function of the detector 12 is to change the electrically neutral atoms into a signal that is usable.

This is accomplished by the ionizer-detector device illustrated in Fig. 18. The tube 36 is attached to the lower end wall 112, and communicates with the evacuated detector chamber 116. The detector is of a completely sealed construction.

Attached to the top wall 114 are electrostatic plates 117 and 118. A narrow slit 120 in the plates permits the atoms entering the detector chamber to strike the ionizing ribbon 122. The ionizing ribbon is preferably a heated tungsten filament which has a long axis aligned with the long axis of the beam of atoms. The width of the ionizing ribbon is such that it will not be struck except by those atoms in that portion of the beam area in which the atoms of the (4, 0) energy level are located. This hot tungsten ribbon is a "surface ionizer"; that is, neutral $Cs^{133}$ particles strike the surface, are adsorbed, and quickly re-evaporate as singly charged positive ions. After ionization, the particles are accelerated to an energy of about 15 e.v. thru the parallel plate system 117, 118. At this energy the particles are deflected through a 60 degree angle by a mass spectrometer 124 of path radius 1.9 cm., and are subsequently accelerated by a parallel plate lens 126 to enter a 14-stage electron multiplier 128. The electron multiplier anode current develops the signals that are utilized in the servo system to be presently described.

The mass-spectrometer 124 is used to separate residual impurities in the source and the hot wire.

An ion pump 130 of any suitable construction is mounted on top of the detector. Its purpose is to rid the system of cesium atoms and gaseous impurities, and thus to maintain the vacuum for extended periods.

In assembling the tube, it is necessary to obtain proper alignment of the source and detector through the tubes 24 and 36. This may be conveniently accomplished by first optically aligning the parts, so that a straight-through path is afforded from the source to the detector. It is then necessary to bend the tubes 24 and 36 slightly to provide the offsets shown in exaggerated form in Figs. 1 and 2. This is best accomplished under actual working conditions, that is, with a beam being emitted from the source and with a radio frequency signal fed to the cavities. The tubes 24 and 36 are then deformed until the detector indicates a maximum output. This deformation is slight, since the offsets are of the order of 0.01 radian. The tubes are then permanently secured in offset position.

Control system

In operation, the intensity of the beam falling on the detector will vary with frequency as shown in Fig. 4. The object of the control system is to maintain the frequency as closely as possible at the central peak of Fig. 4, so that the average frequency will correspond absolutely to the desired frequency and instantaneous deviations therefrom will be small. This is accomplished by a servo system which detects deviations from peak current and adjusts the frequency to bring the operation to the peak. The preferred form of servo and control system will now be described by reference to Fig. 1.

In order that the output frequency may be of any desired value, not necessarily harmonically related to the atomic resonance frequency, the system described in the Grant application Serial No. 601,321, filed July 31, 1956, is preferably used. The basic frequency is here taken to be 5 mc. which is the frequency generated by the crystal-controlled flywheel oscillator 140. One output from this oscillator is fed to the multipliers 142, where the frequency is multiplied by 1780 to obtain a frequency of 9180 mc. Another output is fed to a synthesizer 144, whereby the use of multipliers and dividers, as will be clear to those skilled in the art, a frequency of 12.631840 mc. is obtained. (Although the resonance frequency is generally accepted as 9192.631830 mc., the frequency of 9192.631840 has been found more convenient to obtain, and is within the precision of present knowledge.)

Since any signal obtained directly from the resonance curve of Fig. 4 would not yield any information as to the sense of the error, the output of the synthesizer is frequency-modulated (or phase-modulated) at a low frequency, preferably about 100 c.p.s., for which purpose a 100-cycle generator 146 is provided. It is important that the modulation be linear, and the optimum value of phase modulation is about 40°.

The power for R.F. excitation of the beam tube is obtained from a klystron oscillator 148, operated at about 9147 mc. By reason of the "drift cancellation" feature described in the Grant application, this frequency need not be precisely maintained, as is indicated in the drawing by the ± sign. The klystron output is mixed at 150 with the 9180 mc. output of the multipliers 142 to obtain a 33± mc. signal which is amplified at 151 and is mixed at 152 with the synthesizer output to obtain an output of 45.631840± mc. The output from the mixer 152 is mixed at 154 with the klystron output to obtain a signal of 9192.631840 mc., which signal is exact in frequency to the precision attainable by the atomic resonance method, since any drift in the 9147 mc. klystron frequency is cancelled by the actions in the two mixers 150 and 152. By this means, adequate power for the excitation of the tube is furnished by the klystron oscillator without allowing inaccuracies in its frequency to affect the controlled frequency. The high frequency applied to the cavities is therefore the transition frequency (9192.613840 mc.) phase modulated at 100 c.p.s.

The output of the beam tube detector is at modulation frequency, namely 100 c.p.s. (plus a second harmonic which is utilized in a manner to be described presently). The 100-cycle output varies in intensity in accordance with the deviation of radio frequency from the resonant peak, and differs in phase by 180° depending on whether the deviation is above or below resonance. When the frequency applied to the tube is exactly at resonance, the 100-cycle detector output signal is zero.

The flywheel oscillator 140 is controlled in frequency in dependence on variations in the fundamental beam tube detector current. This is conveniently accomplished by a variable tuning condenser 156 capable of being driven in either direction by a two-phase induction motor 158. To this end the output of the detector is fed to a preamplifier 160 and amplifier 162 to one phase of the drive motor 158, the other phase of which is energized from the 100-cycle generator through a line 163.

Another output from the pre-amplifier 160 is fed a phase-sensitive detector 164 which is also supplied with 100-cycle reference voltage from the generator 146 through a line 166. An indicator 168, which may be a simple galvanometer, is connected to the phase-sensitive detector 160 to register instantaneous variations from the controlled frequency.

An error signal therefore results in driving the motor to rotate the condenser in a direction to null the error. Since the motor is an integrating device, it maintains the average error of the 5 mc. generator equal to zero.

Owing to the curvature of the frequency characteristic of Fig. 4, a second harmonic (200 c.p.s.) appears in the output signal. This second harmonic is used to give a warning indication in the event the system operation becomes faulty for any reason. For example, if the beam should fail, or if the system should go far off resonance, the 100-cycle output would fall to zero, and this would be interpreted by the control circuits in the same manner as a null due to correct operation at the resonant peak. Accordingly the 200 c.p.s. component of the output of the pre-amplifier 160 is filtered and amplified at 170 and is fed to a level indicator, which may take the form of a simple meter, low-current relay, or similar device, which gives an indication or warning signal when the second harmonic drops below a value representative of the peak of the resonance curve. This same device may also be used to distinguish the cenrtal peak of Fig. 4 from the side peaks, since the latter are of different curvature from the central peak and produce smaller second-harmonic components.

Having thus described the invention, we claim:

1. Molecular beam apparatus comprising a source, a detector, an elongated tubular member to enclose a molecular beam between the source and the detector, magnet means external to the tubular member, pole pieces connected to the magnets and disposed adjacent to the beam to form an intense inhomogeneous magnetic field through which the beam passes, means forming a transition region in the tubular member including two spaced cavities, means for feeding microwave energy to the cavities, an elongated magnetic shield U-shaped in section and partly surrounding the tubular member in the transition region, and a field coil wound lengthwise on the shield.

2. Apparatus according to claim 1 in which the pole pieces extend through the walls of the tubular member and are sealed to the walls of the tube.

3. Molecular beam apparatus comprising means for forming a molecular beam, a detector, means forming a transition region, means for applying to the beam in the transition region a small uniform field, generating means for applying a frequency-modulated field at microwave frequency to the beam in the transition region, means for obtaining from the detector output a signal at modulation frequency, means for varying the frequency generated by the generator in a direction to null the fundamental component of the signal, said signal containing a harmonic component which is not nulled at the null of the fundamental, means operated in accordance with amplitude of the harmonic component to indicate operation of the generator at the correct frequency.

4. A molecular beam device comprising source means for producing a beam of molecules, detector means and an elongated tube-like member having a first deflecting portion, a transition portion and a second deflecting portion, said source means being hermetically sealed to the end of said first deflecting portion and said detector means being hermetically sealed to the end of said second deflecting portion, said transition portion comprising two waveguide sections, a first cavity member, a feeding point member and a second cavity member, one side of first cavity being hermetically sealed to the end of said first deflecting section opposite said source means and the other side being hermetically sealed to the end of said first waveguide section, one side of said feed point member being hermetically sealed to the end of said first waveguide section opposite said first cavity and the other side of feed point member being hermetically sealed to one end of said second waveguide section, said second cavity member being hermetically sealed to the end of said second waveguide section opposite said feed point member and the other side of said second cavity member being hermetically sealed to the end of said second deflecting portion opposite said detector, all of which are evacuated to provide an obstacle-free pasageway for said beam of atoms from said source to said detector, magnet means positioned externally of the tube in the first deflecting portion and having pole pieces disposed adjacent to the path of said beam for subjecting said beam to an inhomogeneous magnetic field, and second magnet means positioned externally of the tube in the second deflecting portion and having pole pieces adjacent to the beam for subjecting the beam to a second inhomogeneous field.

5. Apparatus according to claim 4 in which the pole pieces extend through the walls of the tubular member and are sealed to the walls of the tube.

6. Molecular beam apparatus comprising means for forming a molecular beam, an elongated tubular member through which the beam passes, a detector, deflecting means external to the tube at spaced portions thereof, said deflecting means acting to produce inhomogeneous magnetic fields in the vicinity of the beam, the tubular member having a transition region between said deflecting means, means for producing a high-frequency field in the transition region, and means for producing a weak uniform field including an elongated magnetic shield of U-section partly surrounding the tubular member in the transition region, and a field coil for the uniform field wound lengthwise on the shield.

7. Apparatus according to claim 6 in which the means for producing the high-frequency field comprises two spaced cavities, and a waveguide connecting the cavities, and the shield partly surrounds both cavities and the waveguide.

8. Molecular beam apparatus comprising means for forming a molecular beam, a detector, means forming a transition region, means for applying to the beam in the transition region a small uniform field, generating means for applying a frequency-modulated field at microwave frequency to the beam in the transition region, means for obtaining from the detector output a signal at modulation frequency, said signal including a fundamental and a harmonic component, means for varying the generated frequency in a direction to null the fundamental component, and means operated by a drop in amplitude of the harmonic component below a predetermined level to provide an indication of incorrect operation.

9. Molecular beam apparatus comprising a source, a detector, an elongated tubular member to enclose a molecular beam between the source and the detector, magnet means external to the tubular member, pole pieces connected to said magnet means and disposed adjacent to the beam to form an intense inhomogeneous magnetic field through which the beam passes, means for inducing energy-leveling transitions in the beam, means for completely sealing the source, the tubular member and the detector from the atmosphere, an elongated magnetic shield which is U-shaped in cross-section partially surrounding a portion of said tubular member in which said energy-level transitions are induced, and a field coil wound lengthwise on said shield.

10. Molecular beam apparatus comprising a source, a detector, an elongated tubular member to enclose a molecular beam between the source and the detector, two sets of magnets external to the tubular member, said sets being spaced along the tube, each set having pole pieces disposed adjacent to the beam to form an intense inhomogeneous magnetic field through which the beam passes, means for inducing energy-level transitions in the beam in the portion of said tubular member located between said magnets, an elongated magnetic shield U-shaped in cross-section partially surrounding a portion of said tubular member in which said energy level transitions are induced, a field coil wound lengthwise on said shield and means for completely sealing the source, the tubular member and the detector from the atmosphere.

References Cited in the file of this patent

UNITED STATES PATENTS

| 2,227,021 | Schlesinger | Dec. 31, 1940 |
| 2,743,366 | Hershberger | Apr. 24, 1956 |
| 2,808,510 | Norton | Oct. 1, 1957 |

OTHER REFERENCES

Atomic Clocks, by Lyons, in Scientific American, vol. 196, No. 2, February 1957, pages 71–82.